United States Patent [19]
Nelson

[11] Patent Number: 5,168,406
[45] Date of Patent: Dec. 1, 1992

[54] COLOR DEFORMABLE MIRROR DEVICE AND METHOD FOR MANUFACTURE

[75] Inventor: William E. Nelson, Dallas, Tex.

[73] Assignee: Texas Instruments Incorporated, Dallas, Tex.

[21] Appl. No.: 739,078

[22] Filed: Jul. 31, 1991

[51] Int. Cl.⁵ .............................................. G02B 5/08
[52] U.S. Cl. ..................................... 359/855; 359/884
[58] Field of Search ............... 359/891, 884, 223, 846, 359/883, 855; 358/62, 58, 233, 234; 340/783, 763, 764, 815.01, 815.24, 815.27

[56] References Cited

U.S. PATENT DOCUMENTS

| | | | |
|---|---|---|---|
| 4,358,507 | 11/1982 | Senaha et al. | 359/884 |
| 4,383,017 | 5/1983 | Hirefumi et al. | 430/7 |
| 4,580,159 | 4/1986 | Manabe | 359/891 |
| 4,662,746 | 5/1987 | Hornbeck | 350/269 |
| 4,680,579 | 7/1987 | Ott | 358/62 |
| 4,793,699 | 12/1988 | Tokuhara | 359/223 |
| 4,808,501 | 2/1989 | Chiulli | 430/7 |
| 4,955,705 | 9/1990 | Nakajima et al. | 359/884 |

Primary Examiner—Jeffery A. Brier
Assistant Examiner—A. Au
Attorney, Agent, or Firm—Julie L. Reed; James C. Kesterson; Richard L. Donaldson

[57] ABSTRACT

A semiconductor device comprises a plurality of groups of colored mirrors controllable by electronic circuitry. Each group of colored mirrors absorb or reflect specified wavelengths of visible light. The electronic signals control the pathways on which each individual mirror reflect incident light. A first process for manufacturing such a color deformable mirror device ("DMD") includes aligning a dye-bearing substrate over the deformable mirror device and causing specified portions of the dye to sublimate off of the substrate and condense onto particular mirror elements of the deformable mirror device. A second process for producing a colored deformable mirror device places an electro static charge in a dye cloud and introduces the charged cloud to the DMD. The dye migrates to those selected mirrors containing an opposite electrical charge.

10 Claims, 2 Drawing Sheets

COLOR DEFORMABLE MIRROR DEVICE AND METHOD FOR MANUFACTURE

RELATED CASE

This application is related to and filed contemporaneously with "Color Filter for Deformable Mirror Device and Method of Manufacture," Ser. No. 739,079, filed Jul. 31, 1991, by Mignardi et al.

TECHNICAL FIELD OF THE INVENTION

This invention relates generally to the field of electronic devices and more particularly to deformable mirror devices.

BACKGROUND OF THE INVENTION

Deformable mirror devices are active semiconductor devices having on them at least one row of small deflectable mirrors. The mirrors individually reflect incident light along one of two pathways. Electronic signals determine along which of the two pathways each mirror reflects light. Deformable mirror devices may also be manufactured with several individual rows of mirrors or with many rows of tightly spaced mirrors. The latter format, because of its mirror density, is capable of producing images comparable in resolution to monochrome cathode-ray tubes.

The introduction of color to deformable mirror device systems has been problematic to date. One approach to full color deformable mirror device systems is to use three deformable mirror devices, each with a different primary color source or color filter. The three monochrome deformable mirror device images are combined into a single image to produce the desired three color picture. This system has the disadvantages of complex chip alignment, output convergence, and excessive cost and package size of the related optic system.

The preferred approach to color light modulation, therefore, is to use a single deformable mirror device chip modified to produce the desired color image. Simply aligning a matrix of colored windows above the matrix of individual mirrors, however, is not satisfactory. The unmodulated light striking the deformable mirror device is supplied externally to the individual mirrors and off of the final viewing optical axis. Incident light therefore passes through the filter window structure twice before being observed by the human eye. The modulated light therefore passes through two different colored window elements. The requisite geometry is prohibitively complex.

Therefore a need has risen for a single chip deformable mirror device color system which is non-stressing to the mirror elements, provides precise and accurate placement of the dye material on the mirror elements, and whose dyes have acceptable optical and mechanical properties.

SUMMARY OF THE INVENTION

In accordance with the present invention, a deformable mirror device is provided which substantially eliminates or reduces disadvantages and problems associated with prior color deformable mirror device systems. A semiconductor device is disclosed comprising a plurality of deformable mirrors and electronic circuitry for controlling the same. The mirrors are selectably operable to reflect incident light along one of two possible light pathways. The mirrors are divisible into at least two groups. Each group absorbs a particular wavelength or wavelengths of the incident light to produce the characteristic of at least two colors.

One technical advantage of the disclosed invention is the ability to precisely and accurately place colors on individual mirror elements of a deformable mirror device. The particular colors may be arranged so as to create a full color display when viewed at the macroscopic level.

It is another technical advantage that the disclosed process does not interact with the deformable mirror device process chemistry at any level. The coloring process is accomplished by sublimating a dye across a thin air gap from a substrate onto the individual mirror elements. The process is suitable for use with the nearly complete electronic device.

It is yet another technical advantage that the disclosed process applies a thin layer of dye to the deformable mirror device array. The thinness of the dye layer minimizes the induced stresses within the mirror element.

BRIEF DESCRIPTION OF THE DRAWINGS

For a more complete understanding of the present invention, and the advantages thereof, reference is now made to the following descriptions taken in conjunction with the accompanying drawings, in which.

DETAILED DESCRIPTION OF THE INVENTION

Figure 1:
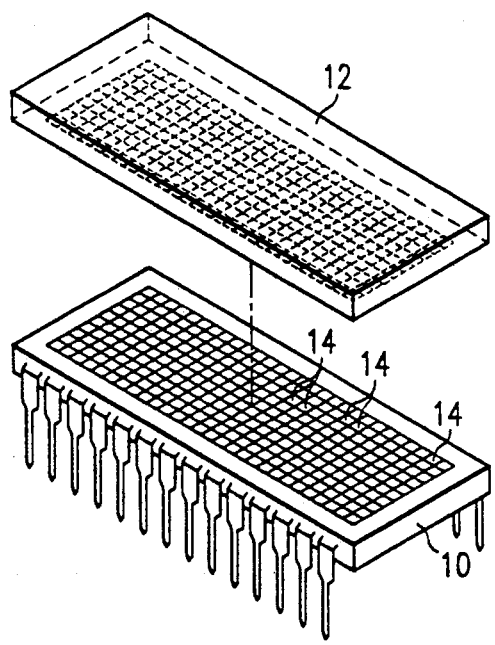
FIG. 1 depicts a perspective view of a dye-bearing substrate aligned above a deformable mirror device.

FIG. 1 shows an area array deformable mirror device ("DMD") 10 below a filter substrate 12. A more complete understanding of deformable mirror devices and their use heretofore may be had by referring to U.S. Pat. No. 4,662,746 entitled "Spatial Light Modulator Printer and Method of Operation," for Hornbeck et al. filed Oct. 30, 1985. That patent is incorporated herein by reference. Deformable mirror device 10 is depicted as a rectangular matrix of mirrors 14. Deformable mirror device 10, however, may take any shape. DMD 10 contains internal circuitry to control along which of two or more pathways each mirror reflects light. Filter substrate 12 contains a sublimable dye on one face. Filter substrate 12 can accommodate any generalized mapping scheme of dye. For instance, the ratio of one color to another may be modified to better suit the response of the human eye or to compensate for color balance in the external light source or in other elements of a related optic system. The sublimable dye is vaporized by the application of heat on the opposite face of substrate 12. The dye then deposits itself on mirrors 14 as more fully described below. The dye absorbs or reflects a particular wavelength or wavelengths of light to produce the effect of color.

Figure 2:
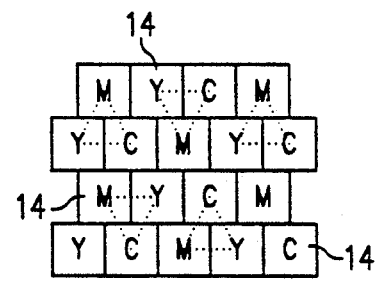
FIG. 2 depicts a diagrammatic view of a typical three-color pattern suitable for creating full color images.

FIG. 2 illustrates one example of a three-color mapping scheme applied to a portion of deformable mirror device 10. In this scheme, "M"=magenta, "Y"=yellow, and "C"=cyan. By staggering the three subtractive primary colors on mirrors 14 as depicted, three individual mirrors may be operated to produce an individual three-color pixel. Three adjacent mirrors, as indicated by the overlying triangles, create each full color pixel. FIG. 2 is only a partial representation of deformable mirror device 10.

Figure 3A:
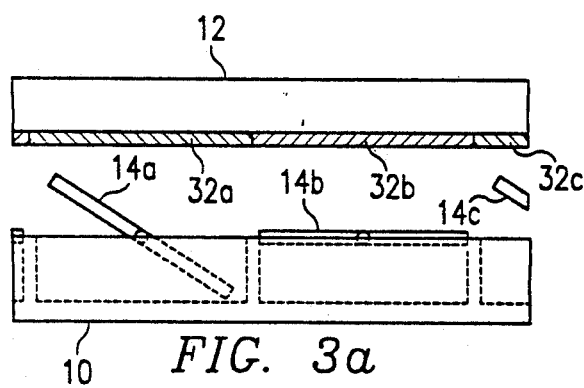
FIGS. 3a and 3b depict cross-sectional side views of a deformable mirror device.
Figure 3B:
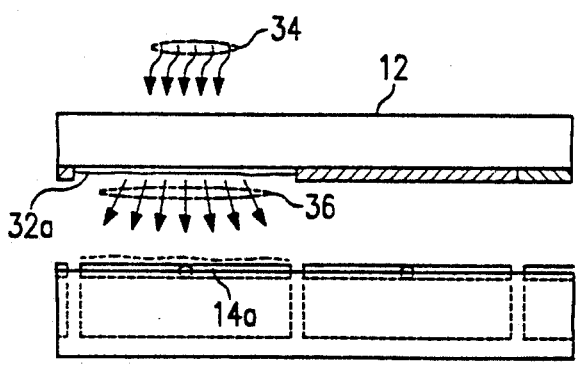

FIGS. 3a and 3b show how a Thermal Dye Sublimation process may be used to apply dye elements 32a, 32b and 32c to mirrors 14a, 14b and 14c on deformable mirror device 10.

In FIG. 3a, substrate 12 may be aligned over deformable mirror device 10 by several means. Alignment may be achieved by using the mirrors themselves in conjunction with the overlying colored dye elements. When substrate 12 and deformable mirror device 10 are aligned precisely, a certain color pattern can be made to appear by inputting appropriate electronic signals to deformable mirror device 10. Substrate 12 may also be aligned with deformable mirror device 10 by purely mechanical means.

In FIG. 3b, heat (represented by arrows 34) is applied to substrate 12 immediately above color dye element 32a. Color dye element 32a then sublimates (as represented by arrows 36) and deposits onto mirror 14a. The resulting intensity of the dye on mirror 14a can be controlled by the duration of the application of heat 34 to substrate 12 as well as by controlling the thickness and color of dye element 32a. Substrate 12 is physically separated from deformable mirror device 10 by a small air gap on the order of tens of microns. Ideally, the donor substrate 12 contains a full set of color dyes, but need not. Several sequential applications of different dyes on different substrates 12 to deformable mirror device 10 could result in the full color pixel pattern depicted in FIG. 2 or in any other scheme. In such an application, each color substrate could bear a single sublimable dye for deposit on selected mirrors 14.

One group of dyes suitable for adding the effect of the three subtractive color primaries, magenta, cyan, and yellow, is known as dye diffusion thermal transfer ("D2T2") dyes. This group of dyes is also used for printing processes. These dyes sublime at fairly high temperatures of the order of 300° C. to 400° C., making them suitable for DMD application where the device may operate at 75° C. to 100° C. for extended periods. The D2T2 dyes are designed to be light-fast, another requirement for the DMD application due to the anticipated period of exposure to illumination. Typical photographic dyes used for color charge-coupled device filters, or polyester textile dyes, do not meet these criteria. D2T2 dyes also adhere well to the smooth aluminum DMD pixel surface, having a polar group to form an attractive bond.

In particular, the yellow dye, for example, may be selected from the methine and azopyridone classes of D2T2 dyes. For magenta, the heterocyclic azo and tricyanovinyl dyes are suitable. Suiteable cyan dyes exist in the heterocyclic azo series, as well as in the phenylazoheterocyclic azo series.

The heat necessary to sublimate dye element 32a in FIG. 3b may be provided by a thermal print head similar to those used in thermal printers, or by a scanning laser.

Figure 4:
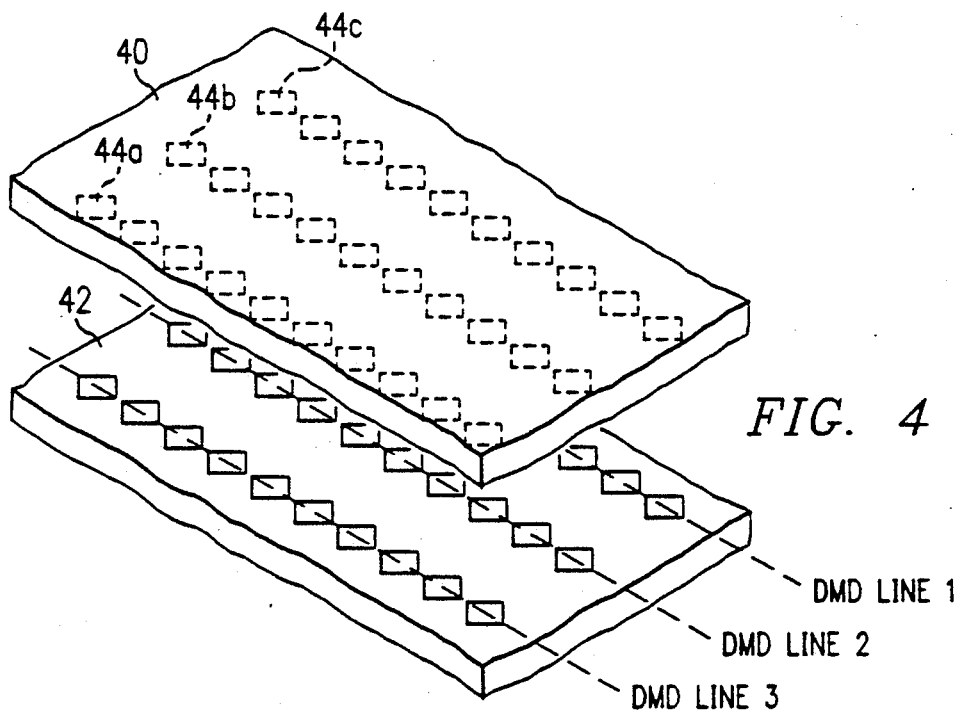
FIG. 4 depicts a perspective view of a second dye-bearing substrate and deformable mirror device.

FIG. 4 illustrates application of the disclosed process to linear-array deformable mirror device chips requiring multi-color or single-color pixels. Substrate 40 is aligned over chip 42 containing three rows of individual mirrors labeled "DMD line 1", "DMD line 2" and "DMD line 3". Substrate 40 contains three rows of dye elements 44a, 44b and 44c. Lines 44a, 44b and 44c may be magenta, yellow, and cyan dyes, respectively, or may be any other combination.

Dye element rows 44a, 44b and 44c are sublimated onto DMD lines 1, 2 and 3 as explained in connection with FIG. 3b.

Figure 5:
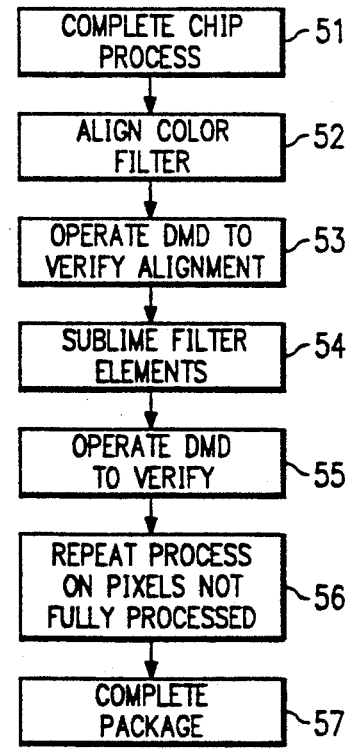
FIG. 5 depicts a flow diagram of the process of the preferred embodiment.

FIG. 5 illustrates a flow chart of the process for sublimating color dye onto a deformable mirror device. The individual deformable mirror device chip is initially fabricated in Complete Chip Process block 51. At this point, all of the individual mirrors on the completed deformable mirror device reflect the same color or colors.

A substrate containing the sublimable dye is then aligned approximately a few tens of microns above the deformable mirror device chip and is aligned in the "X" and "Y" axes such that each dye element is over the desired mirror (block 52). The deformable mirror device is electronically linked to a microprocessor in block 53. There, the microprocessor generates an electronic signal that causes the deformable mirror device chip to align certain mirrors along the second of the possible optical axes of the deformable mirror device. A human operator or machine vision system can then verify the alignment of the substrate and chip by comparing the image produced with that of a reference image. In particular, substrate 12 (FIGS. 1, 3a, and 3b) might be partially transparent to allow the produced image to pass through substrate 12. Other suitable methods could also be used to align the dye substrate and deformable mirror device.

In block 54, the dye elements are sublimated onto the deformable mirror device chip by the application of heat as described with respect to FIG. 3b. The microprocessor then generates a second set of signals to insure that each individual mirror reflects the desired color in block 55. For example, all mirrors of a particular color might be "turned on" to reflect light along the same pathway at the same time. A machine vision system or human operator could then inspect the DMD for any mirror reflecting a color other than that selected. Those deformable mirror devices with no color or with an incorrect color may then be reprocessed in block 56. The mirrors with an incorrect color may be scanned directly with a laser to resublimate the color dye element off of the mirror. Mirrors that have no color or that were subject to the previous corrective action may then be realigned with the same filter substrate or with another filter substrate to reapply the desired color. The steps represented by block 52-56 may be repeated as necessary if additional colors on other substrates need to be sublimated onto the DMD.

The deformable mirror device chip is then completed in block 57 as required by the ultimate electronic system. The deformable mirror device, for instance, might be inserted into a visual display device.

Figure 6:
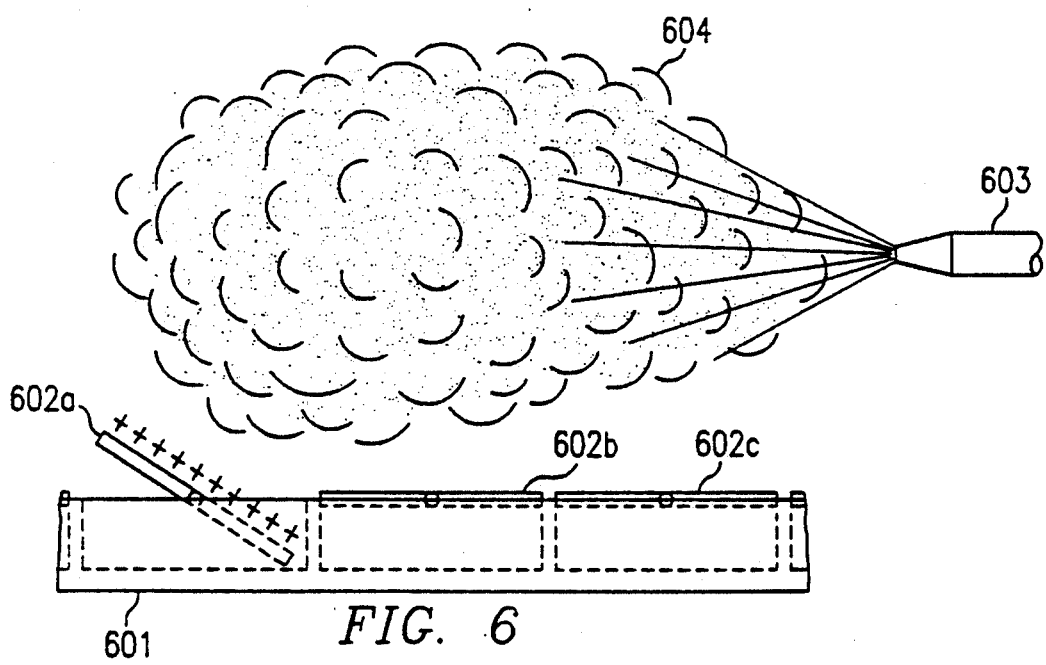
FIG. 6 depicts a second embodiment of the disclosed invention.

FIG. 6 depicts an electrostatic spray painting scheme for dyeing individual mirrors on a deformable mirror device chip. The electrostatic scheme is applicable to devices that are electrostatically charged when activated to reflect light along a particular axis. Deformable mirror device 601 contains individual mirrors 602a, 602b and 602c. A nozzle 603 atomizes and electrostatically charges a color dye 604 such as a D2T2 dye.

Mirror 602a is activated by electronic signals (not shown) to reflect light along a second optical axis. One consequence of the activation of mirror 602a is the occurrence of an electrostatic charge along the surface of mirror 602a. Mirror 602a can therefore be colored while mirrors 602b and 602c remain in their original state. Nozzle 603 atomizes color dye 604. Color dye 604 is produced with a particular electrostatic charge. Here, dye 604 is produced with a negative charge because mirror 602a has a positive electrostatic charge on its surface. The electrostatic charge on mirror 602 could as easily be a negative charge in which case dye cloud 604 would be positively charged by nozzle 603. Dye cloud 604 is then combined with deformable mirror device 601. Color dye 604 is electrically attracted to selected mirror 602a. A portion of color dye 604 then deposits on mirror 602a. Mirror 602b and 602c are not coated with dye from dye cloud 604 because they are electrostatically neutral.

Other mirrors on deformable mirror device 601 could be coated with other colors by successively charging them (activating them to reflect light along a certain axis) and combining them with other oppositely charged dye clouds. In such a way any color pattern, including the one depicted in FIG. 2, could be deposited on deformable mirror device 601.

Although the present invention and its advantages have been described in detail, it should be understood that various changes, substitutions and alterations can be made herein without departing from the spirit and scope of the invention as defined by the appended claims.

What is claimed is:

1. A semiconductor device comprising:
   circuitry for accepting electronic signals;
   a plurality of deformable mirrors selectably operable to reflect incident light responsive to said electronic signals;
   a first group of said mirrors operable to absorb a first group of wavelengths of said incident light; and
   a second group of said mirrors operable to absorb a second group of wavelengths of said incident length.

2. The semiconductor device of claim 1 further comprising a third group of said mirrors, said third group operable to absorb a third group of wavelengths of said incident light.

3. The semiconductor device of claim 2 wherein said first, second, and third groups of mirrors form three-color pixels.

4. The semiconductor device of claim 3 wherein said three-color triads consist of magenta, cyan, and yellow.

5. The semiconductor device of claim 1 wherein at least one of said mirror groups is coated with a sublimable dye.

6. The semiconductor device of claim 5 wherein said sublimable dyes are dye diffusion thermal transfer dyes.

7. The semiconductor device of claim 6 wherein said sublimable dyes are selected from the group consisting of methine, azopyridone, heterocyclic azo, tricyanovinyl, heterocyclic azo, phenylazoheterocyclic azo and mixtures thereof.

8. A semiconductor device comprising:
   a plurality of deformable mirrors selectively operable to reflect incident light responsive to electronic signals;
   a first group of said mirrors coated with a dye selected from the group consisting of methine, azopyridine and mixtures thereof;
   a second group of said mirrors coated with a dye selected from the group consisting of heterocyclic azo, tricyanovinyl, and mixtures thereof; and
   a third group of said mirrors coated with a dye selected from the group consisting of heterocyclic azo, phenylazoheterocyclic azo, and mixtures thereof.

9. The semiconductor device of claim 8 wherein said three groups of mirrors from three-color pixels.

10. The semiconductor device of claim 8 wherein said three groups of mirrors form three separate color lines.

* * * * *